US012630765B2

(12) United States Patent
Kim et al.

(10) Patent No.: US 12,630,765 B2
(45) Date of Patent: May 19, 2026

(54) FERTILIZER COMPOSITION FOR REDUCING METHANE GAS EMISSION COMPRISING ETHEPHON AND USES THEREOF

(71) Applicant: INDUSTRY-ACADEMIC COOPERATION FOUNDATION GYEONGSANG NATIONAL UNIVERSITY, Gyeongsangnam-do (KR)

(72) Inventors: Pil Joo Kim, Gyeongsangnam-do (KR); Gil Won Kim, Gyeongsangnam-do (KR); Byung Yun Ha, Gyeongsangnam-do (KR); Songrae Cho, Gyeongsangnam-do (KR); Jiyeon Lim, Gyeongsangnam-do (KR)

(73) Assignee: INDUSTRY-ACADEMIC COOPERATION FOUNDATION GYEONGSANG NATIONAL UNIVERSITY, Gyeongsangnam-do (KR)

( * ) Notice: Subject to any disclaimer, the term of this patent is extended or adjusted under 35 U.S.C. 154(b) by 686 days.

(21) Appl. No.: 17/921,761

(22) PCT Filed: Aug. 14, 2020

(86) PCT No.: PCT/KR2020/010898
§ 371 (c)(1),
(2) Date: Oct. 27, 2022

(87) PCT Pub. No.: WO2021/221235
PCT Pub. Date: Nov. 4, 2021

(65) Prior Publication Data
US 2023/0165198 A1 Jun. 1, 2023

(30) Foreign Application Priority Data
Apr. 29, 2020 (KR) ........................ 10-2020-0052168

(51) Int. Cl.
*C09K 17/32* (2006.01)
*A01N 57/20* (2006.01)
(Continued)

(52) U.S. Cl.
CPC .............. *C09K 17/32* (2013.01); *A01N 57/20* (2013.01); *A01P 21/00* (2021.08); *C05D 9/00* (2013.01);
(Continued)

(58) Field of Classification Search
CPC ........ C09K 17/32; C09K 17/22; C09K 17/40; A01N 57/20; A01N 27/00; A01P 21/00;
(Continued)

(56) References Cited

U.S. PATENT DOCUMENTS 4,932,995 A * 6/1990 Escobar ................. A01N 57/34 504/195
7,686,863 B1 * 3/2010 Sanders ................... C05D 3/02 71/903
(Continued)

FOREIGN PATENT DOCUMENTS

CN 101273721 A 10/2008
CN 106431754 A 2/2017
(Continued)

OTHER PUBLICATIONS

"Use of Gypsum to Increase Fertilizer Efficiency on Normal Soils." Banaras et al., Asian Journal of Plant Sciences (Year: 2003).*
(Continued)

*Primary Examiner* — Amber R Orlando
*Assistant Examiner* — Heather Elise Silva Rainbow
(74) *Attorney, Agent, or Firm* — The PL Group, PLLC.

(57) ABSTRACT

A fertilizer composition according to an embodiment may reduce methane gas emission. The fertilizer composition includes ethephon as an effective component, and has an
(Continued)

excellent effect of reducing the emission amount of methane gas from soils in which crops are cultivated. As the fertilizer application can be reduced to one application, labor can be saved and also environmental contamination can be prevented.

7 Claims, 1 Drawing Sheet

(51) Int. Cl.

| | |
|---|---|
| ***A01P 21/00*** | (2006.01) |
| ***C05D 9/00*** | (2006.01) |
| ***C05G 3/00*** | (2020.01) |
| ***C05G 5/40*** | (2020.01) |
| ***C09K 17/22*** | (2006.01) |

(52) U.S. Cl.
CPC ................ *C05G 3/00* (2013.01); *C05G 5/40* (2020.02); *C09K 17/22* (2013.01)

(58) Field of Classification Search
CPC .. A01P 15/00; C05D 9/00; C05G 3/00; C05G 5/40; A01G 22/00; A01G 22/22; Y02E 50/30
See application file for complete search history.

(56) References Cited

U.S. PATENT DOCUMENTS

| | | | | |
|---|---|---|---|---|
| 2010/0099567 | A1 * | 4/2010 | Shinichi ................ | A01N 57/20 504/208 |
| 2016/0007592 | A1 * | 1/2016 | Takabe .................... | C05G 5/18 514/483 |

FOREIGN PATENT DOCUMENTS

| | | | | |
|---|---|---|---|---|
| HU | P0203287 | A2 * | 3/2003 | ............... C05G 5/38 |
| JP | 2016-516563 | A | 6/2016 | |
| KR | 10-0829438 | B1 | 5/2008 | |
| KR | 10-2012-0046421 | A | 5/2012 | |
| KR | 10-2013-0049914 | A | 5/2013 | |

OTHER PUBLICATIONS

Machine Translation of Ciaccio HU-P0203287-A2 (Year: 2003).*
International Search Report for PCT/KR2020/010898 mailed on Feb. 1, 2021.
Saiprasad G V S et al., "Influence of ethylene inhibitors and ethrel on production of protocorm like bodies in orchid—Dendrobium 'Sonia'", Journal of Horticultural Sciences, vol. 2, (1), pp. 13-18, 2007.
Office action issued on Oct. 27, 2022 from China Patent Office in a counterpart China Patent Application No. 202080078701.0 (all the cited references are listed in this IDS.) (English translation is also submitted herewith.).

* cited by examiner

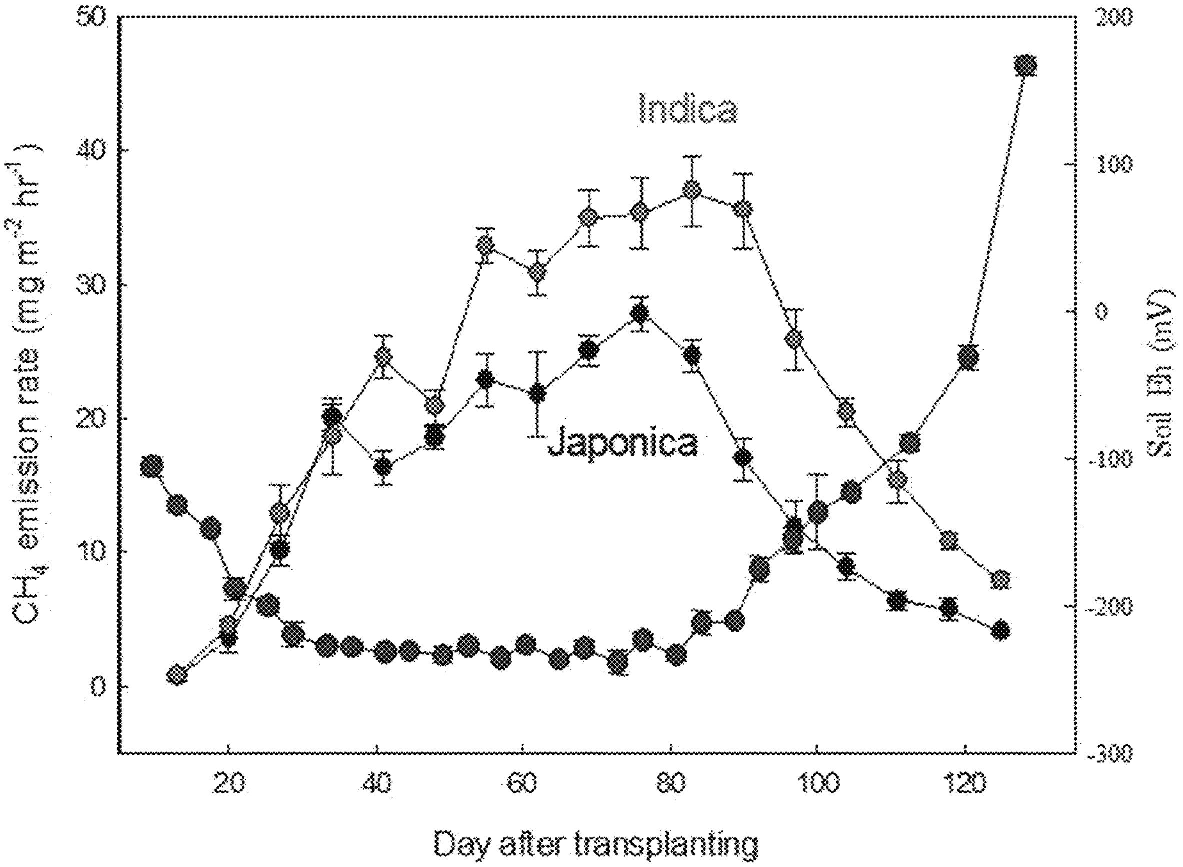
Indica
Japonica
CH4 emission rate (mg m-2 hr-1)
Soil Eh (mV)
Day after transplanting
50
40
30
20
10
0
200
100
0
-100
-200
-300
20
40
60
80
100
120

FERTILIZER COMPOSITION FOR REDUCING METHANE GAS EMISSION COMPRISING ETHEPHON AND USES THEREOF

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2020/010898, filed Aug. 14, 2020, which claims priority to the benefit of Korean Patent Application No. 10-2020-0052168 filed in the Korean Intellectual Property Office on Apr. 29, 2020, the entire contents of which are incorporated herein by reference.

BACKGROUND

1. Technical Field

The present invention relates to a fertilizer composition for reducing methane gas emission comprising ethephon, and uses thereof

2. Background Art

A large amount of methane ($CH_4$) is generated by methanogens (i.e., methanogenic bacteria) during the anaerobic degradation of organic matter in flooded rice paddies. Because a methane molecule has a global warming potential (GWP) about 21 to 28 times that of carbon dioxide, reducing the methane emission amount can be a very effective strategy for combating global warming. According to the report by IPCC (International Panel on Climate Change), methane is emitted in an amount of 1.30 kg/ha/day on average during the process of cultivating rice in flooded rice paddies all over the world. In South Korea, methane emission from flooded rice paddies is much higher, i.e., 2.32 kg/ha/day, and thus a more strenuous effort is required to reduce the methane emission.

To reduce the methane emission from flooded rice paddies, a water management method like intermittent irrigation and midseason drainage, a method of applying stable organic matter like compost and biochar rather than non-compost organic matter, selecting a rice variety having low methanogenic property, a method of managing fertilizer application, or the like have been developed and employed for crop cultivation. However, water management method has a limitation in that, as it is greatly affected by weather conditions like rainfall after draining water, it is not easily expected to have the methane-reducing effect at constant level. Moreover, even when a stable organic matter like compost and biochar is added, the methane emission may be much higher compared to a case of not adding any organic matter, and, since a specific rice variety may be eventually selected by considering the productivity, taste, or the like, selecting a variety with low methane emission and applying it in a broad range also have a limitation. Other than those, efforts are made to reduce the methane emission by adding a soil conditioner or a fertilizer which contains, as an electron acceptor, iron oxide ($Fe^{3+}$), manganese oxide ($Mn^{4+}$), sulfate ion ($SO_4^{2-}$), or nitrate ion ($NO_3^-$).

A technique for specifically inhibiting the activity of methanogens is also developed by taking an advantage of the biochemical reaction mechanism for producing methane, which occurs as a result of the degradation of organic matter by methanogens. As an inhibitor for methanogens, 2-BES (bromoethanesulfonate), 2-CES (chloroethanesulfonate), 2-MES (mercaptoethanesulfonate), and the like have been developed. Those chemicals are a structural analogue of coenzyme M, which is a precursor of methyl coenzyme M produced during the methanogenic process by methanogens, and they are known to be useful for reducing the methane emission when mixed in soils or a feed for ruminants. However, because the structural analogue of coenzyme M has high manufacturing cost and exhibits only little effect on methane emission reduction, it is not widely used in real-world applications.

Meanwhile, in Korean Patent Registration No. 0829438, "Silicate fertilizer composition for reducing methane gas emission in soils, and a method for reducing methane gas emission in soils using the same" is disclosed. However, there is no description regarding the fertilizer composition for reducing methane gas emission comprising ethephon and uses thereof as described in the present invention.

SUMMARY

The present invention is devised under the circumstances that are described in the above. Specifically, inventors of the present invention selected ethephon as a structural analogue of coenzyme M, which is known as an methanogenic inhibitor for reducing methane gas emitted from flooded rice paddies, and, as a result of mixing and processing various biodegradable polymers with ethephon to select a biodegradable polymer for delaying the degradation of ethephon, which is easily hydrolyzed at high pH condition and dissipated in the form of ethylene gas, and measuring the time of retaining ethephon in ethephon preparation, found that ethephon is maintained for 75 days approximately by cellulose acetate among various biodegradable polymers. Accordingly, it was found that cellulose acetate is the optimum biodegradable polymer material for having most effective inhibition of methanogenesis during rice cultivation. Moreover, when a fertilizer was produced by using a mixture of ethephon, cellulose acetate as selected above, and gypsum, and then applied to flooded rice paddies in fresh water before transplantation of rice, it was found that the methane gas emission amount from flooded rice paddies treated with the fertilizer containing ethephon is significantly lower than the emission amount from flooded rice paddies treated with a fertilizer not containing any ethephon, and the present invention is completed accordingly.

To solve the problems described in the above, the present invention provides a fertilizer composition for reducing methane gas emission comprising ethephon as an effective component.

The present invention further provides a method of reducing methanogenesis by treating soils for cultivating crops with the aforementioned fertilizer composition.

The present invention further provides a soil conditioner for reducing methanogenesis comprising ethephon as an effective component.

The fertilizer composition of the present invention is prepared by mixing a cellulose derivative to enhance the stability of ethephon which is easily hydrolyzed and dissipated at high pH condition in soils. With the fertilizer composition of the present invention, the emission amount of methane from soils for cultivating crops can be effectively reduced without having any effect exhibited on the growth and yield of crops.

BRIEF DESCRIPTION OF THE DRAWING

FIGURE illustrates that result of measuring methane ($CH_4$) emission rate (left vertical axis) and soils redox potential (Eh value, right vertical axis), which indirectly represents the oxygen concentration in soils, during the process of cultivating rice (*Oryza sativa*) including *Japonica* rice and *Indica* rice.

DETAILED DESCRIPTION

To achieve the object of the present invention, the present invention provides a fertilizer composition for reducing methane gas emission comprising ethephon as an effective component.

With regard to the fertilizer composition of the present invention, the fertilizer composition may comprise a biodegradable polymer; and any one selected from the group consisting of gypsum, lime, silicate fertilizer, bentonite, and zeolite. The biodegradable polymer may be any one selected from the group consisting of cellulose derivative, humus exudate, amino acids fermentation byproduct (condensed molasses solubles; CMS), and acrylic polymer. It may be preferably a cellulose derivative, but not limited thereto.

With regard to the fertilizer composition of the present invention, the cellulose derivative may be any one selected from the group consisting of cellulose acetate (CA), sodium carboxylmethyl cellulose (CMC), hydroxyethyl cellulose (HEC), and methylcellulose (MC). It may be preferably cellulose acetate, but not limited thereto.

With regard to the fertilizer composition of the present invention, the humus exudate may be a solution obtained by extracting humus (humic acid, fulvic acid, or the like) from peat or the like based on acid and alkali treatment. The amino acids fermentation byproduct may be a highly viscous waste solution generated during the process of producing seasoning or the like. The acrylic polymer may be a polymer containing a reactive unsaturated acrylate monomer like alkylacrylate, alkylmethacrylate, cycloalkylacrylate, cycloalkylethacrylate, alkoxyalkylacrylate, and alkoxyalkylmethacrylate ester, all having 1 to 18 carbon atoms, and hydroxyalkylacrylate, hydroxyalkylmethacrylate ester, acrylonitrile, methacrylonitrile, and trifluoroethylmethacrylate, all having 2 to 8 carbon atoms, or a carboxy group-containing monomer like acrylic acid, methacrylic acid, vinylbenzoic acid, itaconic acid, maleic acid, and fumaric acid, but it is not limited thereto.

With regard to the fertilizer composition of the present invention, by applying a mixture in which the aforementioned ethephon, cellulose derivative, and gypsum are mixed to flooded rice paddies, the emission amount of methane gas from flooded rice paddies can be effectively reduced. According to one embodiment of the present invention, the mixture of ethephon, cellulose derivative, and gypsum may consist of 0.05 to 5% by weight of ethephon, 90 to 98% by weight of gypsum, and 1 to 10% by weight of cellulose derivative relative to the total weight of mixture. Preferably, it may consist of 0.4 to 1% by weight of ethephon, 94 to 98% by weight of gypsum, and 1.5 to 5% by weight of cellulose derivative. More preferably, it may consist of 0.5% by weight of ethephon, 96.5% by weight of gypsum, and 3% by weight of cellulose derivative, but not limited thereto.

When the fertilizer composition of the present invention consists of 0.5% by weight of ethephon, 96.5% by weight of gypsum, and 3% by weight of cellulose derivative relative to the total weight of mixture of ethephon, cellulose derivative, and gypsum, the composition has a property of not easily allowing the ethephon degradation at fresh water conditions of rice paddy soils so that the emission of methane gas from flooded rice paddies can be suppressed by 98% or so.

Ethephon in the fertilizer composition of the present invention is a structural analogue of coenzyme M by having similar structure to coenzyme M, which is known to inhibit the activity of Me-CoM reductase (methyl coenzyme M reductase) as a methanogenic enzyme of methanogens in soil. By inhibiting the methanogenesis by methanogens that are present in soils of flooded rice paddies, it plays a role or reducing the emission amount of methane from soils. In addition, since the cellulose acetate suppresses the ethephon hydrolysis and quick release as ethylene gas under high soil pH condition, it plays a role of extending the sustained effect of ethephon. Gypsum is used to have a proper shape or form such that the mixture of ethephon and cellulose acetate can be used as a fertilizer or a soil conditioner for crop cultivation.

The term "fertilizer" means any material for supplying one or more elements that are required for normal growth of a plant, and it may be categorized into organic fertilizer (consisting of degradable plant/animal materials) and inorganic fertilizer (consisting of chemicals and inorganic materials)

The fertilizer composition of the present invention may further comprise an agriculturally acceptable carrier. Examples of the agriculturally acceptable carrier include a filler, a solvent, a vehicle, a surfactant, a suspending agent, a spreader, an adhesive, an anti-foaming agent, a dispersant, a wetting agent, a drift reducing agent, an auxiliary, an adjuvant, or a mixture thereof. As long as there is no adverse exhibited on the methanogenesis-reducing effect of the present invention, type of the components to be comprised in the composition is not particularly limited.

The fertilizer composition of the present invention may be formulated, with use of a common formulating apparatus, into various forms like granule, powder, or pellet with suitable size, but it is not limited thereto. The formulated fertilizer composition of the present invention may be either directly used or used after air drying at room temperature, or drying by freeze dry or high temperature dry.

The fertilizer composition of the present invention may be used either singly, or used after being blended with other agricultural preparations like nutritional supplements for plant. The composition may be also used in sequence with other agricultural preparations. As for the nutritional supplements for plant, a commonly used fertilizer for supplying nutrition to plant can be used. Furthermore, an organic fertilizer, a compound fertilizer, a nitrogen fertilizer, a phosphate fertilizer, a calcium fertilizer, a lime fertilizer, a silicate fertilizer, a sulfuric acid fertilizer, a magnesium fertilizer, a trace element fertilizer, an excreta fertilizer, or the like can be used as the aforementioned fertilizer. In this regard, specific examples of the aforementioned agricultural preparation would be evident to a person who has common knowledge in the pertinent art.

The present invention further provides a method of reducing methanogenesis by treating soils for cultivating crops with the fertilizer composition described in the above.

With regard to the method according to one embodiment of the present invention, it is preferable that the fertilizer composition is directly applied to soils for cultivating crops. More preferably, the fertilizer composition is applied in an amount of 1 to 50 ton/ha to soils of flooded rice paddies, which are in fresh water state before transplanting rice, to reduce the emission of methane gas from soils, but it is not limited thereto.

Since the fertilizer composition of the present invention can be directly applied to soils of water-flooded rice paddies before transplanting rice and also ethephon is not easily hydrolyzed even under fresh water conditions in the soils of flooded rice paddies, it is characterized by having an excellent effect of reducing the emission of methane gas.

The present invention still further provides a soil conditioner for reducing methanogenesis comprising ethephon as an effective component.

The soil conditioner may comprise a biodegradable polymer; and any one selected from the group consisting of gypsum, lime, silicate fertilizer, bentonite, and zeolite. The biodegradable polymer is the same as defined in the above.

With regard to the soil conditioner of the present invention, emission amount of methane gas from flooded rice paddies can be effectively reduced by treating flooded rice paddies with the mixture having ethephon, cellulose derivative, and gypsum mixed therein, and the mixture having ethephon, cellulose derivative, and gypsum mixed therein is the same as defined in the above.

The term "soil conditioner" means a material used for enhancing the productivity by modifying the physicochemical properties of soils to be suitable for plant growth. With regard to the soil conditioner, the mixture of the present invention, in which ethephon, cellulose derivative, and gypsum are mixed, may be used after mixing with one or more kinds selected from the group consisting of conventional chemical fertilizer, bentonite, zeolite, vermiculite, ammonium, lime salt, rice straw, barley straw, and wild grass, but it is not limited thereto.

Hereinbelow, the present invention is explained in greater detail in view of the Examples. However, the following Examples are given only for exemplification of the present invention, and it is evident that the present invention is not limited to the following Examples.

EXAMPLES

Preparation Example 1. Fertilizer Preparation 1-1. Selection of Structural Analogue of Coenzyme M for Suppressing Methanogenesis It is known that coenzyme M (hereinbelow, "Co-M"), which is produced during the intercellular reactions of methanogens, is an inhibitor for specifically inhibiting the methanogenic activity of methanogens. Accordingly, ethephon was selected in the present invention as a structural analogue of Co-M. Specifically, CES (2-chloroethane sulfonate), BES (2-bromoethane sulfonate), and MES (2-mercaptoethane sulfonate) that are known as a structural analogue of Co-M, and ethephon (IUPAC name: 2-chloroethyl phosphonic acid) selected as a structural analogue of Co-M in the present invention were applied, each at the same concentration (20 mg/kg), to soils at fresh water conditions. Then, along with cultivation for 50 days, methane concentration in headspace and activity of the methanogens in soils were measured.

First, methane concentration in headspace was measured and emission amount of methane gas was analyzed. As a result, it was found that the methane emission amount is reduced by about 48%, 56%, or 56% in the treatment groups of CES, BES, and ethephon, respectively, compared to the control (i.e., soils without sample treatment). Moreover, as a result of analyzing the copy number of mcrA (methyl coenzyme-M reductase) gene, which exhibits the activity of methanogens, it was found that the copy number is reduced by about 39%, 45%, or 55% in the treatment groups of CES, BES, and ethephon, respectively, compared to the control (Table 1 and Table 2).

Based on the above results, it was understood that ethephon can be used as a structural analogue of Co-M which inhibits the activity of methanogens in soils and effectively reduces the emission amount of methane.

TABLE 1

| Methyl coenzyme M (Me—CoM) precursor material Co—M and Co—M structural analogue | | | | | |
|---|---|---|---|---|---|
| Substance | Coenzyme M (Co—M) | 2-Bromoethane sulfonate (BES) | 2-Chloroethane sulfonate (CES) | 2-Mercaptoethane sulfonate (MES) | 2-Chloroethyl phosphonic acid (Ethephon) |
| Chemical structure | 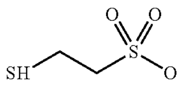 | 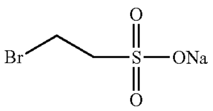 | 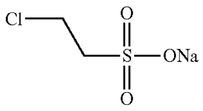 | 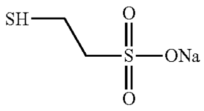 | 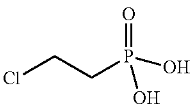 |
| Remark | Me—CoM precursor | Structural analogue of coenzyme M (specific inhibitor for inhibiting the activity of methanogens) | | | New target material |

TABLE 2

| Measurement result of methane emission amount and activity of methanogens in soils | | | | | | | |
|---|---|---|---|---|---|---|---|
| Methane concentration in headspace (mg/L) | | | | Activity of methanogens (mcrA gene copy no./g soil) | | | |
| No treatment | CES | BES | Ethephon | No treatment | CES | BES | Ethephon |
| 9.8 | 5.1 | 4.4 | 4.4 | $3.01 \times 10^6$ | $1.86 \times 10^6$ | $1.65 \times 10^6$ | $1.35 \times 10^6$ |

1-2. Selection of Biodegradable Polymer for Ethephon Stabilization

Rice is characterized in that it shows the highest methane emission amount during flowering period while the emission amount rapidly decreases thereafter (FIGURE). Thus, to effectively reduce the methane emission during the cultivation period of rice, it is important to inhibit effectively the activity of methanogens during the period starting from transplanting to flowering (i.e., about 70 to 80 days). In addition, when soil pH of flooded rice paddies in reduced state is 7 or higher, ethephon is easily hydrolyzed and lost in ethylene gas form. Thus, it is required to control the retention time of ethephon in soils starting from transplanting to flowering. Accordingly, to effectively inhibit the methane emission in soils by delaying the hydrolysis of ethephon, the inventors of the present invention selected cellulose acetate as a biodegradable polymeric material which can enhance the stability of ethephon.

Specifically, as a biodegradable polymeric material, cellulose acetate (CA), sodium carboxylmethyl cellulose (CMC), hydroxylethyl cellulose (HEC), and methyl cellulose (MC), which are cellulose derivatives, and amino acids fermentation byproduct (CMS) were selected first. Then, to 100 ml of water or acetone in which ethephon is dissolved, the cellulose derivative or amino acids fermentation byproduct was added, each in amount of 2 g, and dissolved therein. After mixing the resulting solution with 10 g of gypsum followed by drying, the mixture was crushed to have particle size of not more than 2 mm to prepare fertilizer in powder form. Although one characteristic of ethephon is that it is water-soluble and yet well dissolved in acetone, since cellulose acetate is dissolved best in acetone, acetone was used as a solvent only in the cellulose acetate test group. Since acetone is highly volatile so that it can completely evaporate during the process of mixing and drying ethephon, cellulose acetate, and gypsum, fertilizer can be produced in completely dry state. After adding 10 g of the fertilizer prepared above to 500 ml of water, a change in ethylene concentration in headspace was measured to evaluate the retention time of ethephon in aqueous solution.

As a result, the entire amount of ethephon was found to be degraded within 2 days approximately in the control group (i.e., group not treated with any biodegradable polymer). On the other hand, the retention time of ethephon was significantly longer in the group treated with biodegradable polymer compared to the control group. In particular, the cellulose acetate (CA) treatment group showed the retention time of up to 75 days (Table 3).

Namely, since methane is released in large amount mainly during the period from transplanting to flowering (i.e., about 70 to 80 days) in the process of cultivating rice, it was found that cellulose acetate, which can delay the ethephon degradation for 75 days or so, is the optimum biodegradable polymeric material that can most effectively inhibit the methane emission from soils of flooded rice paddies.

TABLE 3

Determination of effect of delaying ethephon degradation by various cellulose derivatives

| Item | Control group | Cellulose derivative | | | | Ammo acids fermentation |
|---|---|---|---|---|---|---|
| Polymer | No treatment | CMC | HEC | MC | CA | byproduct (CMS) |
| Solvent | Water | Water | Water | Water | Acetone | Water |
| Solution pH | 5.7 | 6.8 | 6.8 | 7.5 | 5.6 | 3.6 |
| Duration in which ethephon is maintained (days) | 2.1 | 23 | 35 | 36 | 75 | 120 or higher |
| Ethephon recovery rate (%) | 98 | 89 | 87 | 85 | 91 | 78 |

1-3. Production of Fertilizer Using Ethephon, Cellulose Acetate, and Gypsum

To acetone in which ethephon has been dissolved at various concentrations based on the blending ratio described in the following Table 4, cellulose acetate was added and dissolved therein. After mixing the resultant with gypsum and drying the mixture till to have evaporation of acetone, the mixture was crushed to have particle size of not more than 2 mm. Accordingly, fertilizer capable of reducing methane emission amount by delaying the ethephon degradation in soils was prepared. Since acetone is highly volatile so that it can completely evaporate during the process of mixing and drying ethephon, cellulose acetate, and gypsum, it is used in minimum amount depending on the total amount of mixture. Meanwhile, the ethephon treatment amount of 2 kg/ha, 6 kg/ha, and 10 kg/ha means that ethephon is applied at concentration of 1 mg/kg, 3 mg/kg, and 5 mg/kg (ppm), respectively, in soils.

Example 1. Determination of Effect of Reducing Emission Amount of Methane Gas by Using Fertilizer of the Present Invention Fertilizer composition prepared by mixing ethephon, cellulose acetate, and gypsum at various mixing ratios was applied in an amount of 2 ton/ha to soils of flooded rice paddies before rice transplanting. Then, emission amount of methane during the subsequent process of cultivating rice, effect of inhibiting methane emission, and yield property of rice were analyzed.

As a result, from the group treated with fertilizer which has not been mixed with any ethephon (i.e., 1940 kg of gypsum were mixed with 60 kg of CA), methane was emitted in total amount of 74.2 kg $CH_4$/ha. On the other hand, from the group treated with fertilizer which has been mixed with 2 kg, 6 kg or 10 kg ethephon, methane was emitted in total amount of 36.9 kg $CH_4$/ha, 15.9 kg $CH_4$/ha, and 1.4 kg $CH_4$/ha, respectively. Fertilizer mixed with 10 kg of ethephon, in particular, showed the methane emission inhibition rate of about 98.1%, indicating highly favorable effect of inhibiting methane emission (Table 4).

It was also found that no significant change in rice yield is shown in relation to the application amount of ethephon. Consequently, it was found that the fertilizer of the present invention can efficiently reduce the emission amount of methane without exhibiting any influence on the growth and yield of rice.

TABLE 4

Determination of effect of inhibiting methanogenesis and growth property of rice depending on various blending ratios of ethephon, gypsum, and cellulose acetate (CA)

| Treatment Amount (kg/ha) | | | Methane emission | Effect of inhibiting methanogenesis | Grain yield | Yield | Straw yield |
|---|---|---|---|---|---|---|---|
| Ethephon | Gypsum | CA | (kg $CH_4$ $ha^{-1}$) | (%) | (kg/ha) | index | (kg/ha) |
| 0 | 1940 | 60 | 74.2 | 0 | 6320 | 100 | 6952 |
| 2 | 1940 | 60 | 36.9 | 50.5 | 6331 | 100 | 6964 |
| 6 | 1940 | 60 | 15.9 | 78.6 | 6298 | 99.6 | 6928 |
| 10 | 1940 | 60 | 1.4 | 98.1 | 6315 | 99.9 | 6946 |

What is claimed is:

1. A method for reducing methanogenesis, the method comprising:

applying a composition comprising ethephon as an effective component, cellulose acetate and gypsum to an area including rice paddy soils for cultivating rice, wherein the composition comprises 0.3 to 1% by weight of ethephon, 94 to 98% by weight of gypsum, and 1.5 to 5% by weight of cellulose acetate, based on a total weight of the composition.

2. The method of claim 1, wherein the composition is a fertilizer composition.

3. The method of claim 1, wherein the applying comprises applying the composition to the rice paddy soils in an amount of 1 to 50 ton/ha.

4. The method of claim 1, wherein the composition is a soil conditioner.

5. The method of claim 1, wherein the applying comprises applying the composition to the rice paddy soils such that the ethephon is present at 6 kg/ha.

6. The method of claim 1, wherein the applying comprises applying the composition to the rice paddy soils such that the ethephon is present at 10 kg/ha.

7. The method of claim 1, wherein the composition comprises 0.5% by weight of ethephon, 96.5% by weight of gypsum, and 3% by weight of cellulose acetate, based on a total weight of the composition.

* * * * *